(No Model.)
I. S. PLATT.
FRUIT BASKET.
No. 323,527. Patented Aug. 4, 1885.
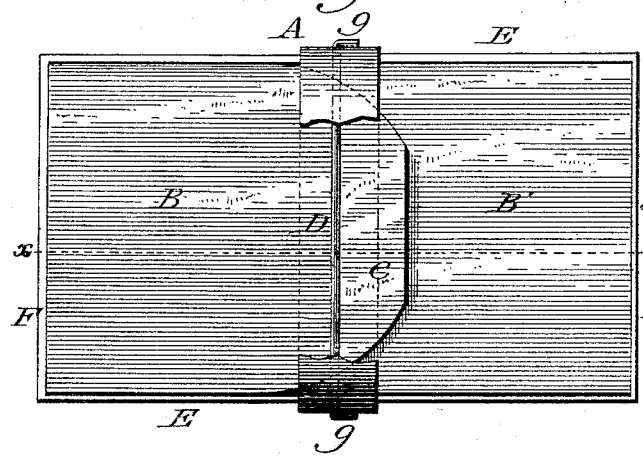
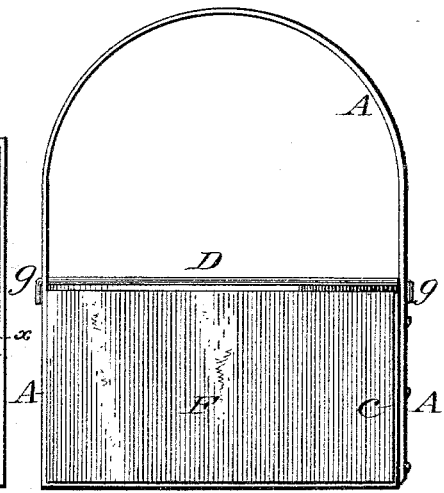
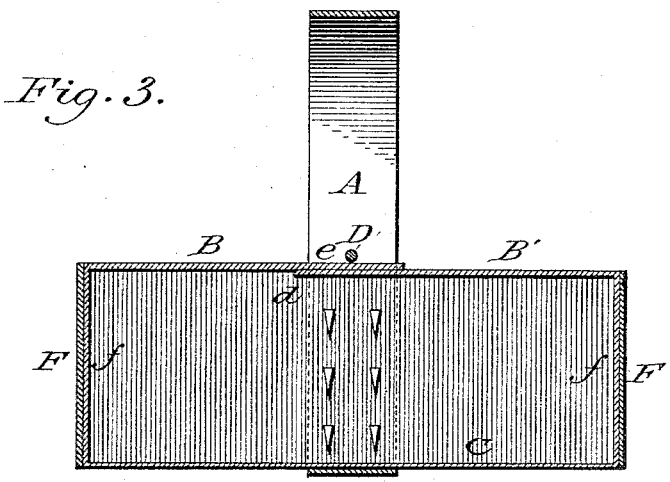
Witnesses:
J. H. Burridge.
F. Adams.
Inventor:
Isaac S. Platt
W. H. Burridge
atty.

UNITED STATES PATENT OFFICE.

ISAAC S. PLATT, OF SANDUSKY, OHIO.

FRUIT-BASKET.

SPECIFICATION forming part of Letters Patent No. 323,527, dated August 4, 1885.

Application filed January 30, 1885. (No model.)

*To all whom it may concern:*

Be it known that I, ISAAC S. PLATT, of Sandusky, in the county of Erie and State of Ohio, have invented certain Improvements in Fruit-Baskets, of which the following is a specification.

The nature of my invention relates to the peculiar construction of the article, which consists, preferably, of three pieces of scale-board or veneer, and so arranged that the said pieces can be packed up for transportation, thereby reducing the bulk of the basket for shipping, and when thus delivered may be easily and readily put together, forming a basket not only as a package for fruit but for other purposes. By means of this basket the articles therein are better protected from theft and injury than in the ordinary fruit-basket.

That the invention may be more fully seen and understood reference will be had to the annexed drawings in connection with the following specification.

Figure 1 is a top view of the basket; Fig. 2, an end view; and Fig. 3, a longitudinal section in direction of the line $x\ x$, Fig. 1.

Like letters denote like parts in the drawings.

At the corners or angles of the pieces forming the basket a score is cut into the wood of sufficient depth to allow of the wood being bent to form a rectangular shape without breaking through the angles or joints of the corners.

In the drawings, A represents the handle of the basket, which is preferably in one piece, lapping down over each side and across the basket bottom, as seen in Figs. 1 and 2. It will be noticed in Fig. 2 that one end, $a$, of the handle laps down under the basket and under the opposite end, $c$, where the parts are fastened together and to the sides of the basket by means of tacks or otherwise. The sides and ends are also preferably of one piece and attached to the handle, as before mentioned.

The top consists of a double lapping-cover, B B', and bottom C is preferred to be in one piece and attached to the handle on the under side, as before described. The ends or terminals $d\ e$, Fig. 3, of the cover lap one over the other, as seen in the drawings. The cover and bottom are connected with end parts, $f\ f$, forming one continuous piece. The ends $f\ f$ may either be on the inside or the outside of the basket ends. In the drawings it is represented as being on the inside of the basket ends. To secure the cover when closed for protecting the contents, a malleable-wire fastener, D, or its equivalent, Figs. 1 and 2, is passed through the sides of the handle and crossed over the top of the cover-laps. The outside ends of said fastener are then bent down on the sides thereof, as seen at $g$ in the drawings. When it is desired to open the basket, the wire lap or bend $g$ is turned back to allow the withdrawal of the wire from over the cover-laps, which can then be raised and the basket opened.

It is preferred to make up the basket of three sections or pieces, though more than this number may be used for the purpose. It will be noticed on examination that the double or lapping cover B B', bottom C, and ends $f\ f$ are of one entire piece. This section of the basket is interior to the external sides and ends E F, Figs. 1 and 2, which sides and ends are also in one piece, being one of the three entire parts of the basket. By this arrangement of the said cover, bottom, and ends the sides of the basket are materially strengthened laterally with the cover and bottom being between the sides. The basket is also re-enforced by the double ends $f$ F $f$ F, Fig. 3, and braced longitudinally by the bottom C and cover. In this way the basket is well braced transversely and longitudinally.

What I claim as my improvement, and desire to secure by Letters Patent, is—

A fruit-basket consisting, preferably, of three parts or sections, with a lapping cover forming the terminals of the ends and bottom, and inclosed at the sides and ends E F by the exterior section, and provided with a handle lapping on over the sides and bottom, and forming a brace above, with a wire fastening across the top and connected to the handle, arranged substantially as set forth.

In testimony whereof I affix my signature in presence of two witnesses.

ISAAC S. PLATT.

Witnesses:
 W. H. BURRIDGE,
 J. H. BURRIDGE.